United States Patent
Ropolyi et al.

(10) Patent No.: US 8,850,012 B2
(45) Date of Patent: Sep. 30, 2014

(54) MECHANISM FOR CHARGING AND SESSION HANDLING SUPPORTING FORKING

(75) Inventors: Robert Ropolyi, Budapest (HU); Jozsef Varga, Nagydobsza (HU)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 11/889,991

(22) Filed: Aug. 17, 2007

(65) Prior Publication Data

US 2008/0046573 A1    Feb. 21, 2008

Related U.S. Application Data

(60) Provisional application No. 60/838,876, filed on Aug. 21, 2006.

(51) Int. Cl.
*G06F 15/16* (2006.01)

(52) U.S. Cl.
USPC ........... 709/226; 709/227; 709/228; 709/229; 370/260; 370/261; 370/262

(58) Field of Classification Search
USPC ............... 709/227, 228, 229, 230; 455/422.1, 455/406, 456.1; 379/114.03, 473, 114.21
See application file for complete search history.

(56) References Cited

U.S. PATENT DOCUMENTS

| | | | | |
|---|---|---|---|---|
| 6,442,258 B1 * | 8/2002 | Mashinsky | ............... | 379/114.02 |
| 6,694,153 B1 * | 2/2004 | Campbell et al. | ............. | 455/560 |
| 6,731,625 B1 * | 5/2004 | Eastep et al. | .................. | 370/352 |
| 7,680,481 B2 * | 3/2010 | Ejzak et al. | .................... | 455/406 |
| 2002/0064149 A1 * | 5/2002 | Elliott et al. | ................... | 370/352 |
| 2003/0097447 A1 * | 5/2003 | Johnston | ....................... | 709/227 |
| 2006/0114932 A1 * | 6/2006 | Cai et al. | ........................ | 370/466 |
| 2007/0002775 A1 * | 1/2007 | Belling | .......................... | 370/260 |
| 2007/0061397 A1 * | 3/2007 | Gregorat et al. | ............. | 709/203 |
| 2007/0159973 A1 * | 7/2007 | Altberg et al. | ................ | 370/230 |
| 2008/0298313 A1 * | 12/2008 | Salminen | ...................... | 370/329 |

FOREIGN PATENT DOCUMENTS

| CN | 1732679 A | 2/2006 |
|---|---|---|
| WO | WO 2004/045195 A1 | 5/2004 |
| WO | WO 2005/039139 A1 | 4/2005 |

OTHER PUBLICATIONS http://www1.avaya.com/pc/SIP_for_Dummies.pdf "SIP Communications for Dummies"—Avaya Apr. 2005.*
http://www.terena.org/activities/tf-vvc/voip-wsh/SIP-tutorial.pdf "SIP Tutorial"—AARNET, Nov. 2005.*
International Search Report, PCT/IB2007/053310, filed Jun. 2, 2008.

(Continued)

*Primary Examiner* — Randy Scott
(74) *Attorney, Agent, or Firm* — Mintz, Levin, Cohn, Ferris, Glovsky & Popeo, P.C.

(57) ABSTRACT

A network node, such as a network control node like a CSCF or an application server, executing forking forward only the first successful response message arriving from a forking branch, which enables the charging function in the forking node and in nodes in the backward direction from this point to apply charges only for the "winning" branch. By including a special Reason header sent in a BYE request of "unused" successfully contacted branches, charging function in nodes in the forward direction from the forking point are allowed to suppress charges for such unused branches. This is applicable both for online and offline charging methods as defined, for example, by 3GPP.

17 Claims, 2 Drawing Sheets

(56) References Cited

OTHER PUBLICATIONS

J. Rosenberg, et al.; "SIP: Session Initiation Protocol"; RFC 3261; pp. 1-269; Jun. 2002.
R. Rohit; "Definitions of Managed Objects for Network Address Translators (NAT)"; RFC 4008; pp. 1-64; Mar. 2005.
H. Schulzrinne; "The Reason Header Field for the Session Initiation Protocol (SIP)"; RFC 3326; pp. 1-8; Dec. 2002.
P. Calhoun; "Diameter Base Protocol"; RFC 3588; pp. 1-147; Sep. 2003.
3GPP TS 24.229 v5.17.0; 3rd Generation Partnership Project; Technical Specification Group Core Network and Terminals; IP Multimedia Call Control Protocol based on Session Initiation Protocol (SIP) and Session Description Protocol (SDP); Stage 3 (Release 5); pp. 1-265; Jun. 2006.
3GPP TS 32.225 v5.7.0; 3rd Generation Partnership Project; Technical Specification Group Service and System Aspects; Telecommunication Management; Charging Management; Charging Data Description for the IP Multimedia Subsystem (IMS) (Release 5); pp. 1-67; Dec. 2004.
3GPP TS 32.225 v6.6.0; 3rd Generation Partnership Project; Technical Specification Group Service and System Aspects; Telecommunication Management; Charging Management; IP Multimedia Subsystem (IMS) Charging (Release 6); pp. 1-58; Jun. 2006.
3GPP TS 32.399 v6.7.0; 3rd Generation Partnership Project; Technical Specification Group Service and System Aspects; Telecommunication Management; Charging Management; Diameter Charging Applications (Release 6); pp. 1-101; Jun. 2006.
3GPP TS 23.228 v7.4.0; 3rd Generation Partnership Project; Technical Specification Group Service and System Aspects; IP Multimedia Subsystem (IMS) Stage 2 (Release 7); pp. 1-197; Jun. 2006.
3GPP TS 32.225 v5.7.0; 3rd Generation Partnership Project; Technical Specification Group Service and System Aspects; Telecommunication Management; Charging Management; Charging Management; Charging Data Description for the IP Multimedia Subsystem (IMS) (Release 5); pp. 1-67; Dec. 2004.

\* cited by examiner

MECHANISM FOR CHARGING AND SESSION HANDLING SUPPORTING FORKING

BACKGROUND OF THE INVENTION

1. Field of the invention

The present invention relates to a mechanism used for charging and connection handling in a communication connection in case of forking. In particular, the present invention is related to a method and apparatus used for charging and session handling for an IMS (IP Multimedia Subsystem) session in case of SIP (Session Initiation Protocol) forking.

For the purpose of the present invention to be described herein below, it should be noted that a user terminal (UE) or terminal device may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;

although reference is made herein to multimedia call or session, this exemplifies only a general example of a connection of any content; content as used in the present invention is intended to mean multimedia data of at least one of audio data (e.g. speech), video data, image data, text data, and meta data descriptive of attributes of the audio, video, image and/or text data, any combination thereof or even, alternatively or additionally, other data such as, as a further example, program code of an application program to be accessed/downloaded;

method steps likely to be implemented as software code portions and being run using a processor at one of the entities described herein below are software code independent and can be specified using any known or future developed programming language;

method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices or means can be implemented as individual devices or means, but this does not exclude that they are implemented in a distributed fashion throughout the system, as long as the functionality of the device is preserved.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's terminal device, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another terminal device, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the terminal device and another communication equipment or terminal device, a database, a server, etc., one or more intermediate network elements such as control network elements, support nodes or service nodes are involved.

One application area whose importance for current and future communication systems increases comprises multimedia communication services. A multimedia call is a communication where, for example, voice (speech), text, data, video and/or picture are used simultaneously. Multimedia calls generally require the transmission of several different types of data (video, audio, and the like) in parallel, and these data are to be transmitted and received by various different types of communication equipments or network elements, so that it is required that plural communication protocols are negotiated and appropriate parameters for the communication are adjusted.

A current technology to merge the Internet with the cellular telecommunication world is the Internet Protocol (IP) Multimedia Subsystem or IMS. IMS is a standardized architecture for operators intending to provide mobile and fixed multimedia services. IMS uses a Voice over IP (VoIP) implementation based on a 3GPP standardized implementation of Session Initiation Protocol (SIP) and runs over the standard Internet Protocol (IP). Both packet-switched (PS) and circuit switched (CS) communication systems are supported.

The goal is to make available services offered by the Internet nearly everywhere by means of cellular mobile communication systems. IMS is introduced as part of the 3GPP standards since Release 5. As a part of the signalling mechanisms used between the IMS and an user equipment the Session Initiation Protocol (SIP) is used. Details of the structure and procedures executed in IMS are described in the related standards and are commonly known to a person skilled in the art so that a description thereof is omitted herein for the sake of simplicity.

For charging, generally two different methods are applicable. Offline charging is applied to users who pay for their services periodically (e.g., at the end of the month). Online charging, also known as credit-based charging, is used for prepaid services. Both may be applied to the same session. For each of these two charging methods, different procedures and network nodes (such as an Online Charging System (OCS) or a Charging Collector Function (CCF) in case of IMS) are used which are commonly known to a person skilled in the art and thus not described here in greater detail.

However, in case of using parallel forking function at session setup, the conventional charging procedures are not properly working. Parallel forking means that the call initiated by a first user is directed in parallel to several possible destination addresses of the called user. For example, if the calling user does not know the current address of the other party, a corresponding proxy server asks a location server for possible addresses of the called party. After receiving the addresses, the proxy server sends corresponding INVITE messages to all addresses simultaneously.

However, for example in case of a IMS session using SIP forking, the present charging solution defined in the corresponding 3GPP specifications are not adapted to handle correctly SIP parallel forking, neither in the forking Call State Control Function (CSCF) nor in the CSCFs in a backward direction (i.e. a direction from a called party to a calling party, or generally towards a calling party) from this point.

In case of online charging, in the forking CSCF, the charging triggers for different forking branches will be mixed up, so that a usual credit control session handling is not usable. On the other hand, in an CSCF located in the backward direction from the forking point, the charging will be incorrect if the forked INVITE request results in more then one 200 OK response, since it can neither be guaranteed that the session description of the proper branch is used for rating, nor that the whole charging session is not terminated by receiving a BYE request generated by the calling UE, for closing those dialogues (forking branches) in which a second, third etc. successful final response was received.

Furthermore, in case of offline charging, Accounting Requests (ACR) reflecting several successful sessions are to be generated in case the forked INVITE request results in multiple 200 OK responses. Therefore, the problem arises that the calling party is going to pay for sessions providing no real user service as well.

SUMMARY OF THE INVENTION

Thus, it is an object of the invention to provide an improved mechanism for a connection handling in case of forking so that charging can be properly effected. In particular, it is an object of the present invention to provide a method and an apparatus usable for a suitable session handling so that charging can be performed correctly during parallel forking.

In particular, according to one aspect of the proposed solution, there is provided, for example, a method comprising initializing a communication connection between at least two parties, executing forking of the communication connection at a network node to a plurality of branches in a forward direction (i.e. a direction from the calling party to the called party) of the network node, receiving, at the network node, response messages from destination nodes of at least one branch of the plurality of branches, forwarding a first successful response message from one of the destination nodes in a backward direction (i.e. a direction from a called party to a calling party) side of the network node, generating a connection terminating message in response to a receipt of further successful response messages from at least one other destination node differing to the first successful response, and forwarding the connection terminating message to the at least one other destination node for terminating a dialog with the at least one other destination node.

In addition, according to one aspect of the present solution, there is provided, for example, an apparatus comprising participating means for participating on the initialization of a communication connection between at least two parties, executing means for executing forking of the communication connection to a plurality of branches in the forward direction of the network node, receiving means for receiving response messages from destination nodes of one branch of the plurality of branches, forwarding means for forwarding a first successful response message from one of the destination nodes to an backward direction side of the apparatus, generating means for generating a connection terminating message in response to a receipt of further successful response messages from at least one other destination node differing to the first successful response, and connection forwarding means for forwarding the connection terminating message to the at least one other destination node for terminating a dialog with the at least one other destination node.

Furthermore, according to one aspect of the proposed solution, there is provided, for example, an apparatus configured to receive a connection terminating message in response to a successful response messages in reply to an communication connection initialization, process a predetermined parameter which is included in the connection terminating message and indicates that the communication connection is completed with another destination, and suppress a charging in response to the receipt of the connection terminating message including the predetermined parameter.

Moreover, according to one aspect of the proposed solution, there is provided, for example, an apparatus, comprising receiver means for receiving a connection terminating message in response to a successful response messages in reply to an communication connection initialization, processor means for processing a predetermined parameter which is included in the connection terminating message and indicates that the communication connection is completed with another destination, and suppressor means for suppressing a charging in response to the receipt of the connection terminating message including the predetermined parameter.

Furthermore, according to one aspect of the proposed solution, there is provided, for example, a method comprising initializing a communication connection between at least two parties, executing forking of the communication connection at a network node to a plurality of branches in a forward direction of the network node, and setting up a separate credit control sessions for each branch.

Moreover, according to one aspect of the proposed solution, there is provided, for example, an apparatus configured to participate on the initialization of a communication connection between at least two parties, execute forking of the communication connection to a plurality of branches in the forward direction of the network node, and set up a separate credit control sessions for at least one branch of the plurality of branches.

Furthermore, according to one aspect of the proposed solution, there is provided, for example, an apparatus comprising participating means for participating on the initialization of a communication connection between at least two parties, executing means for executing forking of the communication connection to a plurality of branches in the forward direction of the network node, and setting means for setting up a separate credit control sessions for at least one branch of the plurality of branches.

In addition, according to one aspect of the proposed solution, there is provided, for example, an apparatus comprising a participating unit configured to participate on the initialization of a communication connection between at least two parties, an executing unit configured to execute forking of the communication connection to a plurality of branches in the forward direction of the network node, a receiver configured to receive response messages from destination nodes of at least one branch of the plurality of branches, a forwarding unit configured to forward a first successful response message from one of the destination nodes to an backward direction side of the apparatus, a generating unit configured to generate a connection terminating message in response to a receipt of further successful response messages from at least one other destination node differing to the first successful response, and a connection forwarding unit configured to forward the connection terminating message to the at least one other destination node for terminating a dialog with the at least one other destination node.

Furthermore, according to one aspect of the proposed solution, there is provided, for example, an apparatus comprising a receiver configured to receive a connection terminating message in response to a successful response messages in reply to an communication connection initialization, a processor configured to process a predetermined parameter which is included in the connection terminating message and indicates that the communication connection is completed with another destination, and a suppressor configured to suppress a charging in response to the receipt of the connection terminating message including the predetermined parameter.

Moreover, according to one aspect of the proposed solution, there is provided, for example, an apparatus comprising a participating unit configured to participate on the initialization of a communication connection between at least two parties, an executing unit configured to execute forking of the communication connection to a plurality of branches in the forward direction of the network node, and a setting unit configured to set up a separate credit control sessions for at least one branch of the plurality of branches.

Furthermore, according to one aspect of the proposed solution, there is provided, for example, a computer program embodied on a computer readable medium, the computer program being configured to control a processor to perform: initializing a communication connection between at least two parties, executing forking of the communication connection at a network node to a plurality of branches in a forward direction of the network node, receiving at the network node response messages from destination nodes of at least one branch of the plurality of branches, forwarding a first successful response message from one of the destination nodes in a backward direction side of the network node, generating a connection terminating message in response to a receipt of further successful response messages from at least one other destination node differing to the first successful response, and forwarding the connection terminating message to the at least one other destination node for terminating a dialog with the at least one other destination node.

Moreover, according to one aspect of the proposed solution, there is provided, for example, a computer program embodied on a computer readable medium, the computer program being configured to control a processor to perform: initializing a communication connection between at least two parties, executing forking of the communication connection at a network node to a plurality of branches in a forward direction of the network node, and setting up a separate credit control sessions for at least one branch of the plurality of branches.

According to further refinements, the proposed solutions may comprise at least one of the following features:

a failure response message may be sent to the backward direction side of the network node in response to a receipt of a further successful response messages from the at least one other destination node differing to the first confirming response in case a provisional response is forwarded to the backward direction side of the network node before the receipt of the first successful response message;

a charging of the communication connection may be performed, wherein the charging may be effected only for the branch from which the first successful response message is received and a charging for other branches is terminated;

the charging may comprise one of online charging or offline charging;

in the connection terminating message a predetermined parameter may be included indicating that the communication connection is completed with another destination;

a charging may be suppressed in a network node located in the forward direction of the network node executing the forking in response to a receipt of the connection terminating message including the predetermined parameter;

in the network node and on the backward direction side thereof a charging session for branches for which the failure response message is sent may be terminated;

in case of an online charging, a separate credit control sessions may be set up for each branch;

the network node executing the forking may be a network control node or an application server.

Furthermore, according to one aspect of the proposed solution, there is provided, for example, an apparatus configured to receive a connection terminating message in response to a successful response messages in reply to an communication connection initialization, to process a predetermined parameter which is included in the connection terminating message and indicates that the communication connection is completed with another destination, and to suppress a charging in response to the receipt of the connection terminating message including the predetermined parameter.

Moreover, according to one aspect of the proposed solution, there is provided, for example, an apparatus comprising a receiver for receiving a connection terminating message in response to a successful response messages in reply to an communication connection initialization, a processor for processing a predetermined parameter which is included in the connection terminating message and indicates that the communication connection is completed with another destination, and means for suppressing a charging in response to the receipt of the connection terminating message including the predetermined parameter.

According to a further refinement the apparatus may be configured to execute, for suppressing the charging, a credit control update procedure by using parameters configured to terminate the charging.

Furthermore, according to one aspect of the proposed solution, there is provided, for example, a method comprising initializing a communication connection between at least two parties, executing forking of the communication connection at a network node to a plurality of branches in a forward direction of the network node, and setting up a separate credit control session for each branch.

In addition, according to one aspect of the proposed solution, there is provided, for example, an apparatus configured to participate on the initialization of a communication connection between at least two parties, execute forking of the communication connection to a plurality of branches in the forward direction of the network node, and set up a separate credit control sessions for each branch.

Moreover, according to one aspect of the proposed solution, there is provided, for example, an apparatus comprising means for participating on the initialization of a communication connection between at least two parties, means for executing forking of the communication connection to a plurality of branches in the forward direction of the network node, and means for setting up a separate credit control sessions for each branch.

By virtue of the proposed solutions, it is possible to achieve that charging is effected correctly even in case of forking, i.e. that users have to pay only for services that have been really used. In other words, it can be excluded that users have to pay also for only service related signalling which can occur in the conventional charging methods. When using the proposed example for charging and session handling in a communication connection, a charging functionality is able to determine which branch is to be charged while credit control sessions belonging to other forking branches not used (or terminated) may be closed as unsuccessful. Furthermore, the proposed example for charging and session handling in a communication connection is applicable to both an online charging and an offline charging, and it is easy to implement in existing and future system as no additional elements are required in the network structure.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a 3GPP system where a session between parties via two IMS networks, i.e. a multimedia communication connection or session between user terminals located in these IMS networks, is done and SIP forking is used for the establishment of the session. However, it is to be noted that the present invention is not limited to an application in such a system or environment but is also applicable in other network systems, connection types and the like.

A basic system architecture of communication networks in which the charging and session handling mechanism according to the present invention is usable may comprise a commonly known architecture of an IMS network. As will be described in connection with the figures, such a network architecture comprises several control nodes or CSCF which are SIP servers or proxies fulfilling several roles (such as Interrogating CSCF (I-CSCF), Proxy CSCF (P-CSCF), Serving CSCF (S-SCSF)) and used to process SIP signalling packets in the IMS. Furthermore, charging functionalities like a CCF or an OCS are provided which are used for charging control. Moreover, network nodes like Interconnect Border Control Function (IBCF), Subscription Locator Function (SLF) and Home Subscriber Server (HSS) which are queried through interfaces from an I-CSCF are part of the complete architecture. The general functions and interconnections of these elements are known to those skilled in the art and described in corresponding specifications so that a detailed description thereof is omitted herein. However, it is to be noted that there are provided several additional network elements and signaling links used for a communication connection.

Furthermore, the network elements and their functions described herein may be implemented by software, e.g. by a computer program product for a computer, or by hardware. In any case, for executing their respective functions, correspondingly used devices, such as a user terminal, core network control element, CSCF, an access network subsystem element like a Base Station Subsystem BSS element or Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. This means that the respective network environments, i.e. the IMS domain, may comprise several elements and/or functionalities not shown which are known, however, to a person skilled in the art and therefore not described in greater detail herein.

According to one example of a mechanism used for charging and connection handling in a communication connection in case of forking according to the invention, when a communication connection between at least two parties is initialized and forking of the communication connection is executed at a network node, such as a network control node or an application server, to a plurality of branches in a forward direction (i.e. a direction from the calling party to the called part, or generally towards a called party) of the network node, there are received in response to respective request messages from the forking network node to the plurality of destination nodes response messages which may include, for example, successful response messages (such as a 200 OK message in case of SIP), failure response messages (such as 4xx messages in case of SIP) or information response messages (such as 1xx provisional responses in case of SIP). In case of failure and information response messages, a normal processing thereof may be executed by the forking network node, such as termination of a dialog or forwarding of the message to the calling side (in a backward direction (i.e. a direction from a called party to a calling party)).

On the other hand, when successful response messages are received, the session handling is as follows. A first successful response message from one of the destination nodes is forwarded to an backward direction side of the forking network node, so that a corresponding processing thereof can be effected as prescribed, for example by the specifications of the correspondingly used network. However, when further successful response messages from at least one other destination node differing to the first successful response are received in the forking network node, this is or these are not proxied in the backward direction. Instead, a connection terminating message is generated in response to a receipt thereof and forwarded to the respective destination node or nodes so that the dialog in this branch or in these branches is terminated.

In case of a communication connection or session to be established between parties in an IMS environment, this means that whenever a forking CSCF or AS receives subsequent 200 OK final responses for the forked initial INVITE request, the S-CSCF (representing a network control node) should terminate that response, acknowledge the response with an ACK request, send a BYE request (as a connection terminating message) to this dialog in order to terminate it.

In case a provisional response had been sent before from the same UE (such as an information response message which is forwarded to the backward direction side), the forking network node (i.e. the forking S-CSCF, for example) sends an appropriate failure response message, such as a 4xx message, towards the calling party.

The connection terminating message, such as the BYE request, generated by the forking network node for subsequent (200 OK) successful response messages comprises a predetermined parameter, for example a Reason Header with value of "Call completed elsewhere". In addition, a "trust parameter" set to guarantee that the BYE message is generated by a trusted network (and not, for example, by a UE) may be included. Preferably, the functions of this session handling are implemented in all network control nodes such as CSCF nodes in order to ensure that further functions, such as charging of the forking branches, can be handled as described below.

In the following, a further example of the mechanism used for charging and connection handling in a communication connection in case of forking is described in connection with the signalling diagram shown in FIG. 1. The case depicted in FIG. 1 is related to a session handling in case of parallel forking and an online charging solution for a communication connection/session in an IMS environment using SIP signalling.

In the signalling diagram according to FIG. 1, signalling between and processing in the following network nodes is explained: user equipments UE-A and UE-B1, UE-B2, UE-B3 (UE-Bx representing possible destination addresses of the same user) which represent the parties of the communication connection to be established, an S-CSCF of a network 1 where the UE-A is located as a network control node, an OCS of the network 1, an I-CSCF of a network 2, which is the home network of the UE-B, an S-CSCF of the network 2 which is the forking network node, and an OCS of the network 2.

Figure 1:
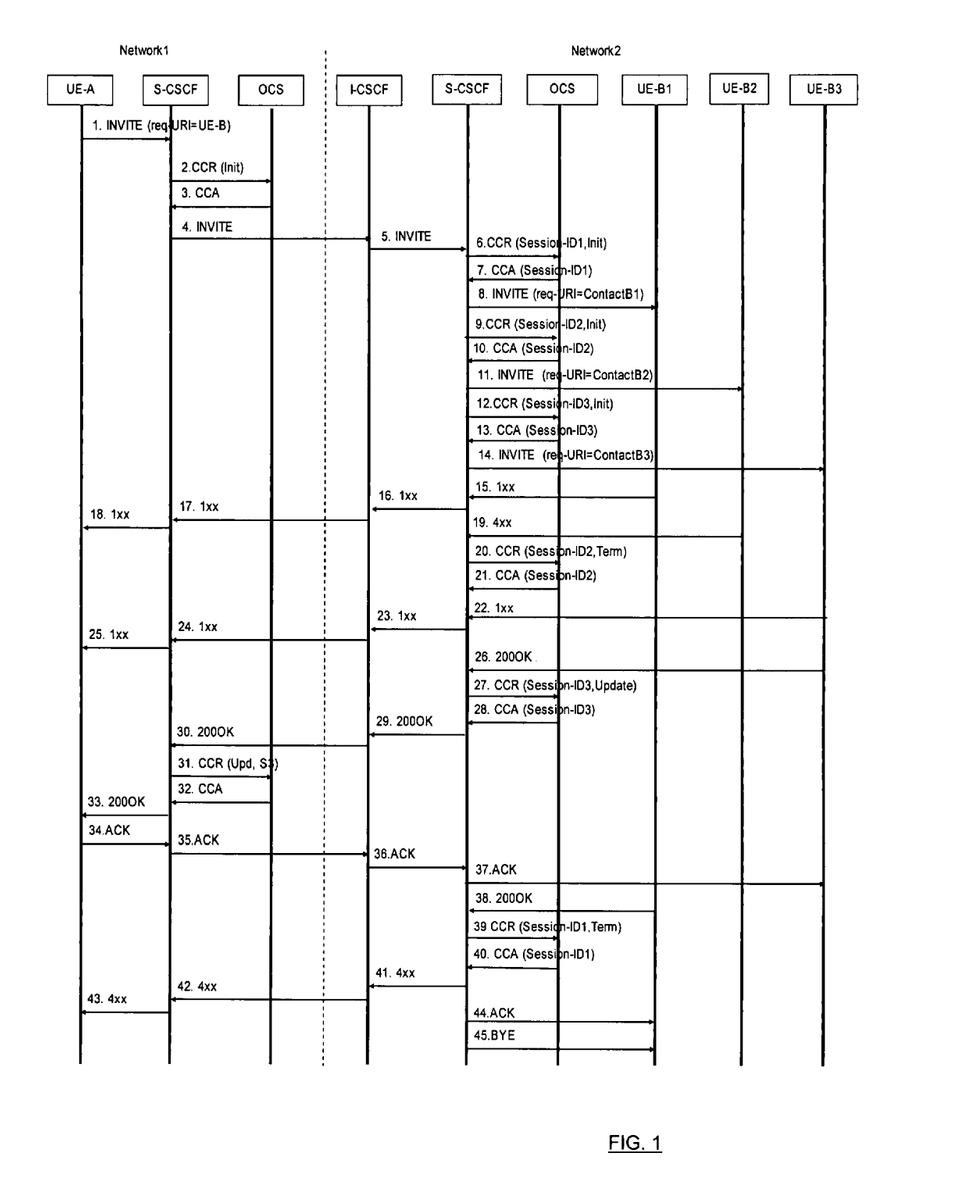
FIG. 1 shows a signalling diagram according to a charging and session handling procedure in case of online charging according to an example of an embodiment of the present invention.

When the communication connection is started to be established, the UE-A as the calling party sends an INVITE message comprising an identifier such as an Uniform Resource Identifier URI of the destination UE-B via the network 1 to the S-CSCF of network 1 (message 1 of FIG. 1). The S-CSCF of network 1 starts a credit control session with the OCS of network 1 (message 2: Charging Control Request CCR for initializing the credit control session, and message 2: Charging Control Answer from OCS). Furthermore, the INVITE message is forwarded to the I-CSCF of network 2 where the UE-B is located (message 4 of FIG. 1). The I-CSCF of network 2 forwards the INVITE message with message 5 to an S-CSCF of network 2 in order to contact the UE-B. (Details for S-CSCF selection, like Subscription Location Function SLF or Unified Messaging Server (UMS) queries were omitted here for the sake of simplicity.)

The S-CSCF of network 2 executes forking in order to find the called user and sends INVITE messages (messages 8, 11 and 14) to possible destination addresses of the UE-B (i.e. UE-B1, UE-B2 and UE-B3) in order to contact them. Furthermore, the forking node S-CSCF establishes a separate credit control session for each of the forking branches with the OCS of network 2 (see messages 6, 7, 9, 10 and 12, 13). For this purpose, corresponding CCRs sent are independent of each other, i.e. for example no special Attribute Value Pair (AVP) is used for a correlation or signalling in the forking case. This enables the OCS to check the credit availability for each branch independently (credit check may lead to disallowing the setup of some branches, which is not discussed further here) and to rate the session according to the finally selected callee, as described in the following.

It is to be noted that although there is no specific method used for signalling the correlation of the credit control sessions, IMS-Charging_Identifier and User-Session_ID AVPs carried by the requests will be the same. By means of this, the OCS may consider that only one of the allocated quotas will be really used, i.e. they can be implicitly pooled. This can be relevant only if the user would not have enough credit to allow for parallel setup of the forking branches.

Optionally, a correlation mechanism may be used. A possible solution for that is using the same Session-ID value in all the credit control sessions involved for forking branches and distinguishing them by utilising, for example, an "Accounting-Sub-Session-ID" AVP known to those skilled in the art. Another option could be to utilise an Acct-Multi-Session-ID known to those skilled in the art. This AVP has to be set for the same value in all involved credit control sessions and different Session-IDs can be used in each of them.

In dependence of the response type received at the S-CSCF of network 2 for the INVITE messages 8, 11 and 14 the handling of the respective branches differs.

In case a provisional response message, such as an information response message 1xx is received, as shown by message 15 from UE-B1 or message 22 from UE-B3, this provisional type message is forwarded to the calling party via the network (see, for example, messages 16 to 18 as well as messages 23 to 25 of FIG. 1).

In case a failure or unsuccessful response message is received, such as a 4xx message 19 from UE-B2, a communication connection to this destination is not possible and the dialog with this destination node is closed. Accordingly, credit control sessions belonging to such forking branches, which generate unsuccessful final responses, will be closed with the corresponding OCS when receiving the final response (see messages 20 and 21 of FIG. 1 for terminating the credit control session between the S-CSCF and the OCS of network 2).

If a first successful response message is received from one of the branches of the destination nodes for forking, such as a 200 OK message 26 from UE-B3, the credit control session belonging to this branch in which the first 200 OK response is received is handled in a commonly known manner (see messages 27 and 28 of FIG. 1 concerning a credit control session update between the S-CSCF and the OCS), such as defined by the current 3GPP specifications, for example. Furthermore, the successful response message is sent upstream by the S-CSCF to the calling party where the establishment of the communication connection is completed and acknowledged to the corresponding successful destination (see messages 29, 30 and 33 to 37), and the credit control session on the backward direction side (S-CSCF and OCS of network 1) is updated (see messages 31 and 32).

Note that in the scenario presented on FIG. 1, it is assumed that OCS in both networks have set triggers which led to reporting CCR updates at 2000K messages. It is possible, however, that such updates are not reported, but the content of charging information reported during the lifetime of these charging sessions is the same as it would have been with these triggers set. Specifically, if time based charging is used, the S-CSCF nodes will report the used units considering the receipt of this first 2000K response (message 26 and 30, respectively)

On the other hand, in case further successful response message(s) from other branches being different to the first successful branch are received, the following processing is effected.

When a subsequent successful response message, such as 200 OK message 38 from UE-B1, is received at the forking network node, the response is terminated by the forking node, here the S-CSCF of network 2. Furthermore, the 200 OK response message is acknowledged with an ACK request (message 44). Then, a connection terminating message, such as a BYE request message 45 is sent in this dialog with UE-B1 in order to terminate it. The BYE request generated by the forking network node preferably comprises a predetermined parameter, for example a Reason Header with value of "Call completed elsewhere". In addition, a "trust parameter" which is set to guarantee that the BYE message is generated by a trusted network (and not, for example, by a UE) may be included.

In the case shown in FIG. 1, as mentioned above, there had been received a provisional response message (1xx message 15) from this destination UE-B1 beforehand which has been forwarded to the backward direction. Therefore, an appropriate unsuccessful or failure response message, such as a 4xx response message, is sent in addition to the calling UE in order to cause the backward direction side nodes to terminate the dialog (see messages 41 to 43 of FIG. 1).

Parallel with the handling of these SIP dialogues, the credit control session(s) belonging to branch(es) in which the subsequent successful (200 OK) responses are received will be terminated, similarly as if unsuccessful response had been received. According to the present example, complying with currently standardised AVP values, a CCR terminate request is sent from the forking S-CSCF to the OCS (message 39) in which all AVPs are set as if an unsuccessful (4xx) final response had been received, e.g. "Cause Code" AVP (part of IMS information AVP) is set to 4xx. This is answered by the OCS with a corresponding CCA message 40. Another solution can be using new Cause Code that reflects the specific forking branch release information.

A network node, such as a network control node CSCF in the backward direction from the forking point establishes only one credit control session, but it handles the charging triggers as defined in the following. The Charging Trigger Function CTF in such a node has to be aware of and follow the forking branches by using the remote tags received in subsequent SIP responses. Furthermore, a CCR update request is sent only when receiving a 200 OK final response from one of the contacted users (message 31 in FIG. 1) or a negative final response is received for the last branch pending (i.e. for branch for which a provisional response have been received earlier).

On the other hand, a network control node, such as an S-CSCF node, in the forward direction from the forking point is not aware of the fact that the INVITE request handled is a forking branch. Therefore, it may generate a credit control session as in any other case. However, if a BYE request (such as message 45) is received, which contains the predetermined parameter such as the Reason Header as described above, the node in the forward direction of the forking node generates a CCR update request with units in Used Service Unit AVP (e.g. CC-Time (Charging Control Time)) set to zero, irrespective of the time elapsed until the reception of the BYE message. In this way, it can be avoided that a session is charged in which the called user cannot participate but is contacted only as part of a hunting effort.

Optionally, the new Cause code as proposed above can be inserted into the request. The OCS has to use this AVP value to prevent any charges possibly levied for successful sessions with zero length. (This will be further explained connected to FIG. 2, see below)

Next, a further example of the mechanism used for charging and connection handling in a communication connection in case of parallel forking is described in connection with the signalling diagram shown in FIG. 2. The case depicted in FIG. 2 is related to a session handling in case of forking and an offline charging solution for a communication connection/session in an IMS environment using SIP signalling.

In the signalling diagram according to FIG. 2, signalling between and processing in the following network nodes is explained: user equipments UE-A and UE-B1, UE-B2, UE-B3 (UE-Bx representing possible destination addresses of the same user) which represent the parties of the communication connection to the established, an S-CSCF of a network 1 where the UE-A is located as a network control node, an CCF of the network 1, an I-CSCF of a network 2 where the UE-B is located, an S-CSCF of the network 2 which is the forking network node a CCF of the network 2, and a P-CSCF serving UE-B1 (while other P-CSCFs are omitted for the sake of simplicity).

Figure 2:
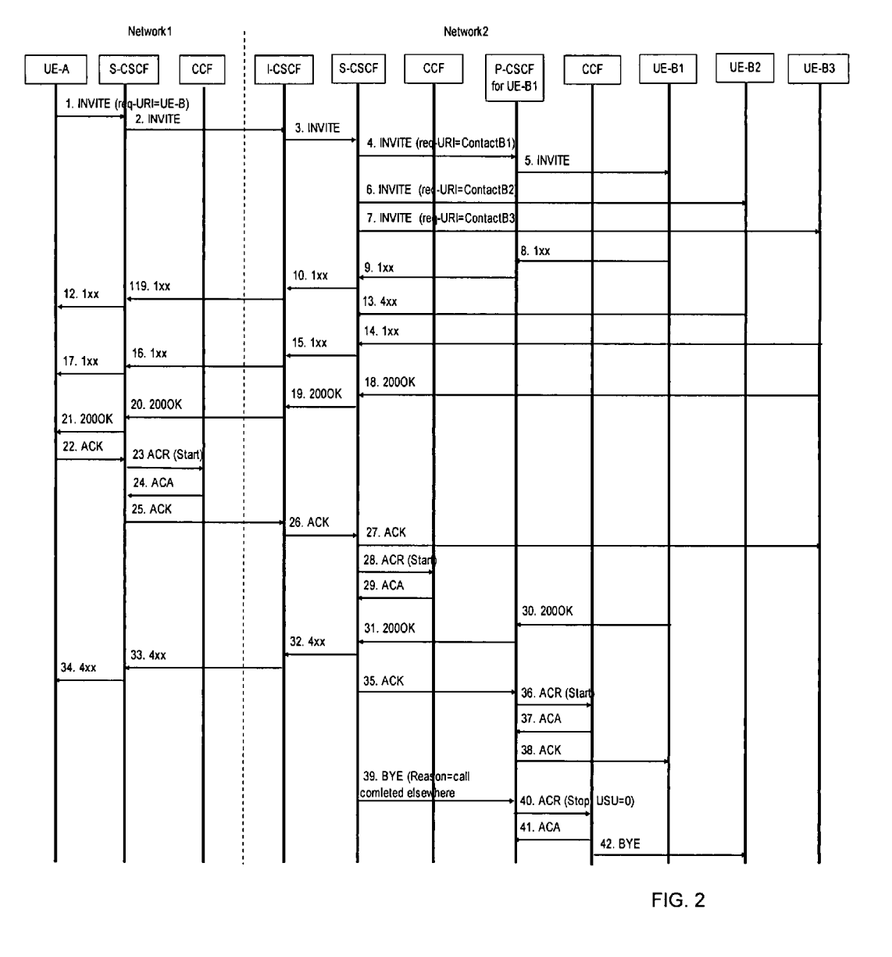
FIG. 2 shows a signalling diagram according to a charging and session handling procedure in case of offline charging according to another example of an embodiment of the present invention.

When the communication connection is started to be established, the UE-A as the calling party sends an INVITE message comprising an identifier such as an Uniform Resource Identifier URI of the destination UE-B via the network 1 to the S-CSCF of network 1 (message 1 of FIG. 2). The S-CSCF of network 1 forwards the INVITE message to the I-CSCF of network 2 where the UE-B is located (message 2 of FIG. 1). The I-CSCF of network 2 forwards the INVITE message with message 3 to an S-CSCF of network 2 in order to contact the UE-B.

The S-CSCF of network 2 executes forking in order to find the correct address of the UE-B and sends INVITE messages (messages 4 and 5 (via the P-CSCF), message 6 and message 7) to possible destination addresses of the UE-B (i.e. UE-B1, UE-B2 and UE-B3) in order to contact them.

In dependence of the response type received at the S-CSCF of network 2 for the INVITE messages 4, 6 and 7 the handling of the respective branches differs similarly to the example shown in FIG. 1.

In case a provisional response message, such as an information response message 1xx is received, as shown by message 8 from UE-B1 or message 14 from UE-B3, this provisional type message is forwarded to the calling party via the network (see, for example, messages 10 to 12 as well as messages 15 to 17 of FIG. 2).

In case a failure or unsuccessful response message is received, such as a 4xx message 13 from UE-B2, a communication connection to this destination is not possible and the dialog with this destination node is closed.

If a first successful response message is received from one of the branches of the destination nodes for forking, such as a 200 OK message 18 from UE-B3, the successful response message is forwarded by the forking network node in the backward direction to the calling party UE-A (see messages 19 to 21 of FIG. 2). There, the establishment of the communication connection is completed and acknowledged to the corresponding successful destination (see messages 22 and 25 to 27 of FIG. 2).

In the present example of offline charging, the forking node establishes only one accounting session for the forked session. An Accounting Request ACR (Start) for starting charging (message 28) is sent after the first 200 OK response is received. This ACR contains information referring only to the "winning" branch, e.g. it contains information about the Session Description Protocol (SDP) which defines a protocol which conveys information about media streams in multimedia sessions to allow the recipients of a session description to participate in the session, agreed between UE-A and UE-B3. The charging functionality (CCF) of the network 2 of the forking node responds with a corresponding Accounting Answer ACA message 29. It is to be noted that in case all the branches are terminated by a negative final response, an ACR is generated after receiving the last final response. It may contain information according to the last final response received. (Note that depending on the operators preferences, the generation of the ACR for such unsuccessful attempts might be not requested at all.)

A network control node such as a CSCF node located in the backward direction from the forking point, such as S-CSCF serving UE-A in FIG. 2 creates only one accounting session. The CTF in such a node has to be aware of and follow the forking branches. An ACR (Start) request is sent only when receiving ACK for a 200 OK final response from one of the contacted users (as shown in connection with message 20 (200 OK received) and messages 23 and 24: ACR to charging functionality of network 1 and corresponding ACA answer message) or when a negative final response is received for the last branch pending (not shown in FIG. 2).

On the other hand, a network control node located in the forward direction from the forking point, such as a P-CSCF node serving UE-B1, is not aware of the fact that the INVITE request handled is a forking branch. Therefore, it may generate an accounting session as in any other case (message 36 and 37 to and from CCF of network 2 in FIG. 2).

In case the forking node receives further successful response message(s) from other branches being different to the first successful branch, the following processing is effected.

When a subsequent successful response message, such as 200 OK message 31 from UE-B1, is received at the forking network node, the response is terminated, for example, by the S-CSCF of network 2. Furthermore, the 200 OK response message is acknowledged with an ACK request (message 35 of FIG. 2). Then, a connection terminating message, such as a BYE request message 39 is sent to this dialog with UE-B1 in order to terminate it. The BYE request generated by the forking network node preferably comprises a predetermined parameter, for example a Reason Header with value of "Call completed elsewhere". In addition, a "trust parameter" set to guarantee that the BYE message is generated by a trusted network (and not, for example, by a UE) may be included.

If BYE request is received by the network control node located in the forward direction from the forking point, such as the P-CSCF serving UE-B1 in FIG. 2, which contains a Reason header as specified above, it generates an ACR (Stop) request, with units in Used Service Unit AVP (e.g. CC-Time) set to zero, irrespective of the time elapsed until the reception of the BYE message (message 40, answered by message 41 from the CCF). Optionally, a special Cause Code value can be included into the request, as described for online charging case. It is to be noted that this can be applicable for terminating S-CSCF as well if the forking node is e.g. the originating S-CSCF (not shown in FIG. 2)

As described above, a network node, such as a network control node like a CSCF or an application server, executing forking forward only the first successful response message arriving from a forking branch, which enables the charging function in the forking node and in nodes in the backward direction from this point to apply charges only for the "winning" branch. By including a special Reason header sent in a BYE request of "unused" successfully contacted branches, charging function in nodes in the forward direction from the forking point are allowed to suppress charges for such unused branches. This is applicable both for online and offline charging methods as defined, for example, by 3GPP.

It should be noted that online and offline charging scenarios presented above can be mixed: it is possible e.g. that offline charging is used for one of the called parties and online charging for the other, or it is also possible that P-CSCF applies offline charging and S-CSCF applies online charging for the same user. The charging solutions for online and offline charging described above for each node can be invoked in the proper combination, ensuring that the SIP session branch providing real user service will be charged.

It should be understood that the above description and accompanying figures are merely intended to illustrate the present invention by way of example only. The preferred embodiments of the present invention may thus vary within the scope of the attached claims.

What is claimed is:

1. A method, comprising:
   initializing a communication connection between at least two parties comprising a calling party and a called party;
   executing forking of the communication connection at a network node to a plurality of branches in a forward direction of the network node, wherein the forking comprises sending a plurality of invites through the plurality of branches to the called party;
   establishing a separate credit control session for each forked communication connection with the plurality of branches;
   receiving, at the network node, a plurality of response messages from at least one branch of the plurality of branches;
   forwarding a first received response message in a backward direction towards the calling party, wherein the first received message comprises a first successful response message to at least one of the plurality of invites sent through the plurality of branches to the called party, wherein the first successful response message is received before one or more further received response messages;
   generating at least one connection terminating message in response to a receipt of the one or more further received response messages;
   forwarding the at least one connection terminating message to terminate at least one of the sessions for the one or more further response messages associated with at least one of the plurality of branches other than a branch from which the first successful response message is received;
   maintaining the credit control session for the branch from which the first successful response message is received; and
   terminating credit control sessions for the at least one terminated session, such that charging is applied for the branch from which the first successful response message is received, and charging for at least one other branch corresponding to the at least one terminated session is suppressed.

2. The method according to claim 1, wherein the plurality of invites comprise session initiation protocol invitations, and the first successful response message comprises a 200 okay message.

3. The method according to claim 1, wherein the charging comprises one of online charging or offline charging.

4. The method according to claim 1, further comprising:
configuring the connection terminating message to comprise a predetermined parameter indicating that the communication connection is completed with another destination.

5. The method according to claim 4, further comprising:
suppressing a charging in a network node located in the forward direction of the network node executing the forking in response to a receipt of the connection terminating message including the predetermined parameter.

6. The method according to claim 2, further comprising:
terminating in the network node and on the backward direction side thereof a charging session for branches for which the failure response message is sent.

7. The method according to claim 1, further comprising:
setting up a separate credit control session for each branch in case of online charging.

8. The method according to claim 1, wherein the executing comprises executing the forking at a network node comprising one of a network control node and an application server.

9. An apparatus comprising:
at least one processor; and
at least one memory including computer program code, the at least one processor, the at least one memory, and the computer program code configured to cause the apparatus to at least:
initialize a communication connection between at least two parties comprising a calling party and a called party;
execute forking of the communication connection at a network node to a plurality of branches in a forward direction of the network node, wherein the forking comprises sending a plurality of invites through the plurality of branches to the called party;
establish a separate credit control session for each forked communication connection with the plurality of branches;
receive, at the network node, a plurality of response messages from at least one branch of the plurality of branches;
forward a first received response message in a backward direction towards the calling party, wherein the first received message comprises a first successful response message to at least one of the plurality of invites sent through the plurality of branches to the called party, wherein the first successful response message is received before one or more further received response messages;
generate at least one connection terminating message in response to a receipt of the one or more further received response messages;
forward the at least one connection terminating message to terminate at least one of the sessions for the one or more further response messages associated with at least one of the plurality of branches other than a branch from which the first successful response message is received;
maintain the credit control session for the branch from which the first successful response message is received; and
terminate credit control sessions for the at least one terminated session, such that charging is applied for the branch from which the first successful response message is received, and charging for at least one other-branch corresponding to the at least one terminated session is suppressed.

10. The apparatus according to claim 9, wherein the plurality of invites comprise session initiation protocol invitations, and the first successful response message comprises a 200 okay message.

11. The apparatus according to claim 9, wherein the charging comprises one of online charging or offline charging.

12. The apparatus according to claim 9, wherein the connection terminating message comprises a predetermined parameter indicating that the communication connection is completed with another destination.

13. The apparatus according to claim 12, further configured to:
suppress a charging in a network node located in the forward direction of the network node executing the forking in response to a receipt of the connection terminating message including the predetermined parameter.

14. The apparatus according to claim 9, further configured to:
terminate in the network node and on the backward direction side thereof a charging session for branches for which a failure response message is sent.

15. The apparatus according to claim 9, further configured to:
set up a separate credit control sessions for each branch in case of online charging.

16. The apparatus according to claim 9, wherein the network node executing the forking is one of a network control node and an application server.

17. A non-transitory computer readable medium including code which when executed by a processor provides operations comprising:
initializing a communication connection between at least two parties comprising a calling party and a called party;
executing forking of the communication connection at a network node to a plurality of branches in a forward direction of the network node, wherein the forking comprises sending a plurality of invites through the plurality of branches to the called party;
establishing a separate credit control session for each forked communication connection with the plurality of branches;
receiving, at the network node, a plurality of response messages from at least one branch of the plurality of branches;
forwarding a first received response message in a backward direction towards the calling party, wherein the first received message comprises a first successful response message to at least one of the plurality of invites sent through the plurality of branches to the called party, wherein the first successful response message is received before one or more further received response messages;
generating at least one connection terminating message in response to a receipt of the one or more further received response messages;
forwarding the at least one connection terminating message to terminate at least one of the sessions for the one or more further response messages associated with at least one of the plurality of branches other than a branch from which the first successful response message is received;
maintaining the credit control session for the branch from which the first successful response message is received; and
terminating credit control sessions for the at least one terminated session, such that charging is applied for the branch from which the first successful response message is received, and charging for at least one other branch corresponding to the at least one terminated session is suppressed.

* * * * *